(12) United States Patent
Cmielowski et al.

(10) Patent No.: US 10,572,827 B2
(45) Date of Patent: Feb. 25, 2020

(54) PREDICTION QUALITY ASSESSMENT

(71) Applicant: International Business Machines Corporation, Armonk, NY (US)

(72) Inventors: Lukasz G. Cmielowski, Cracow (PL); Umit M. Cakmak, Cracow (PL); Pawel Slowikowski, Cracow (PL); Andrzej J. Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/671,211

(22) Filed: Aug. 8, 2017

(65) Prior Publication Data

US 2019/0050748 A1 Feb. 14, 2019

(51) Int. Cl.
| | |
|---|---|
| *G06N 20/00* | (2019.01) |
| *G06F 9/50* | (2006.01) |
| *G06Q 10/06* | (2012.01) |
| *G06N 5/02* | (2006.01) |
| *G06Q 30/02* | (2012.01) |
| *G06Q 10/04* | (2012.01) |
| *G06F 16/2455* | (2019.01) |

(52) U.S. Cl.
CPC .......... *G06N 20/00* (2019.01); *G06F 9/5011* (2013.01); *G06N 5/022* (2013.01); *G06Q 10/067* (2013.01); *G06Q 30/0204* (2013.01); *G06F 16/2455* (2019.01); *G06Q 10/04* (2013.01)

(58) Field of Classification Search
CPC ...... G06N 20/00; G06N 5/022; G06F 16/906; G06F 9/5011

USPC ..................................... 365/189.05; 703/2, 7
See application file for complete search history.

(56) References Cited

U.S. PATENT DOCUMENTS

| | | | |
|---|---|---|---|
| 8,583,576 B1 | 11/2013 | Lin et al. | |
| 9,002,682 B2 * | 4/2015 | Kasabov | ................ G06Q 10/04 703/2 |

(Continued)

FOREIGN PATENT DOCUMENTS

| | | |
|---|---|---|
| JP | 2016091306 A | 5/2016 |
| JP | 6061439 B2 | 1/2017 |

OTHER PUBLICATIONS

Chen et al., "A Dynamic Bus-Arrival Time Prediction Model Based on APC Data", Computer-Aided Civil and Infrastructure Engineering 19 (2004), pp. 364-376, Published by Blackwell Publishing.

*Primary Examiner* — Vu A Le
(74) *Attorney, Agent, or Firm* — Scott S. Dobson

(57) ABSTRACT

A current data set with multiple records is fed into a data analysis model. The current data set is limited to data occurring in a current time window with a predetermined window size. The model is run on the current data set and a current data prediction result is generated. Limited historical data sets having multiple records are selected. Each record has values for several features. Each historical data set is limited to data occurring in a historical time window having the window size. A historical class label distribution is determined for the historical data sets and an upper and lower control limit are determined for the historical data sets using the historical class label distribution. A current class label distribution having a mean value is determined for the current prediction result. An alert is provided when the mean value is not between the upper and lower control limit.

18 Claims, 3 Drawing Sheets

(56) References Cited

U.S. PATENT DOCUMENTS

| | | | |
|---|---|---|---|
| 2004/0249779 A1* | 12/2004 | Nauck | G05B 13/0275 706/47 |
| 2008/0154814 A1 | 6/2008 | Chaudhury et al. | |
| 2009/0070081 A1 | 3/2009 | Saenz et al. | |
| 2014/0101076 A1 | 4/2014 | Martin et al. | |
| 2016/0275406 A1 | 9/2016 | Chan et al. | |
| 2016/0364647 A1 | 12/2016 | Achin et al. | |

* cited by examiner

PREDICTION QUALITY ASSESSMENT

BACKGROUND

The present invention relates to the field of digital computer systems, and more specifically, to a method of modifying a predictive data analysis model.

Many software applications leverage prediction data from prediction models created by data scientist. However, there is a need for a systematic check if such predictions are correct and to identify errors like incorrect input data connected to the prediction models.

SUMMARY

Described herein are embodiments of a method for enabling modification of a predictive data analysis model. The method includes feeding a current data set having multiple records into the predictive data analysis model. The current data set is limited to data occurring in a current time window with a predetermined window size. The predictive data analysis model is run on the current data set and a current data prediction result is generated. At least two limited historical data sets having multiple records are selected with each comprising values for several features. Each set of the historical data sets is limited to data occurring in a historical time window having the window size. A historical class label distribution for the historical data sets is determined. An upper control limit and a lower control limit for the historical data sets are determined using the historical class label distribution. A current class label distribution for the current prediction result is determined with the current class label distribution having a mean value. An alert is provided in response to the mean value not being between the upper control limit and the lower control limit.

Further described herein are embodiments of a computer program product and a computer system configured to perform the method.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
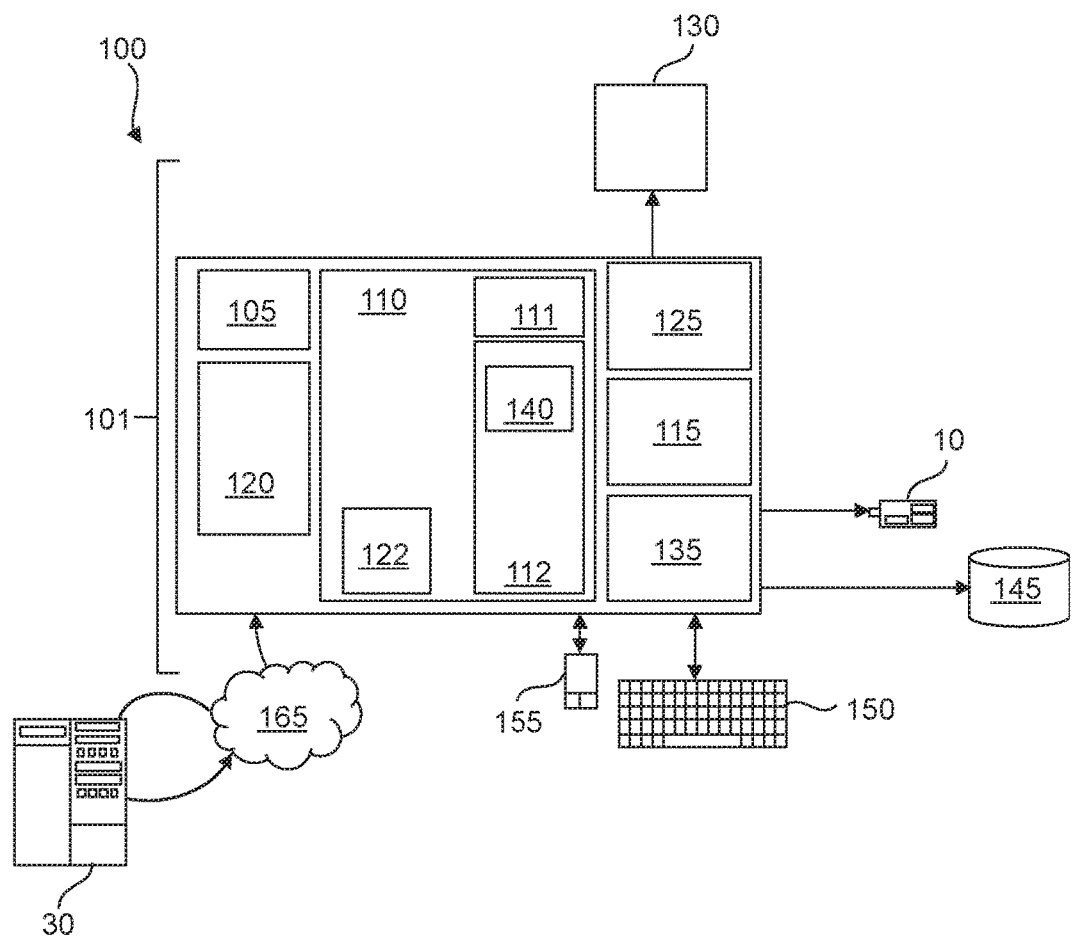
FIG. 1 depicts an example computer system, suited for implementing one or more method steps as described in the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The predictive data analysis model is configured to predict the class label of an unknown record when presented with the attribute set of the unknown record. The record may be characterized by a tuple (x,y), where x is the attribute set and y is an attribute, designated as the class label (also referred to as target attribute). The attribute set may include multiple attributes. The record is an unknown record if the value of the class label of the record is unknown. The record is a known record if the value of the class label of the record is known. The predictive data analysis model may be built or generated using a learning algorithm. The learning algorithm builds or learns the predictive data analysis model that best fits the relationship between the attribute set x and class label y of an input data set. The input data set may be a training data set. The input data set is a collection of known records, wherein each record is characterized by the same tuple (x, y). The predictive data analysis model may be based on regression or classification modeling.

The mean value of the current class label distribution may, for example, be the mean value of the predicted values of the class label. In another example, the mean value of the current class label distribution may be the mean value of the number of occurrences of each distinct value of the predicted values of the class label. The method includes alerting or notifying that something is wrong when control limits are not met. For example, a data scientist and/or data officer may be alerted or notified that there may be an issue with the data analysis model and/or with the data (e.g. if different data is coming in for prediction than data used in the training/learning process). The aim of the present method is to detect such anomalies in prediction results and alert/notify the proper owners.

The present method may have the advantage of providing an accurate prediction of the class labels.

According to one embodiment, the method further includes modifying the data analysis model. The modification of the data analysis model is performed such that when the method is repeated the mean value becomes between the upper control limit and the lower control limit. The fact that the mean values are not between the upper control limit and said lower control limit may be due to the training data used to train the data analysis model and/or to the data analysis model itself.

In one example, the modifying may include prompting a user for a correction of the data analysis model, receiving the correction from the user and applying the correction resulting in the modification of the data analysis model.

In another example, the modification may automatically be performed. The method may, for example, include providing multiple data analysis models, where the modifying of the data analysis model includes automatically switching to another data analysis model from the multiple models. In another example, the modifying includes automatically retraining the data analysis model using a training dataset (e.g. feedback data) different from the training data used to train the data analysis model before being applied in the method. The model retraining may be run based on a previously created model definition (pipeline) and new training data (sometimes called feedback data). Feedback data includes data with known class label values gathered after the initial model training. In another example, the modifying may include automatically tuning the data analysis model upon the occurrence that the prediction data is correct but model quality is quite poor on such data. Tuning may involve changing the classification algorithm, regression algorithm etc. and/or modifying preprocessing steps (e.g. adding data normalization, tuning particular algorithm parameters).

According to one embodiment, the method further includes, upon modifying the data analysis model, repeating the method. For example, the repetition may be performed until the mean value is between the upper and lower limits.

According to one embodiment, the method further includes feeding or inputting the historical data sets into the data analysis model, running the data analysis model on the historical data sets, and generating a historical data prediction result, where the determining of the historical class label distribution is performed from the historical data prediction result. This embodiment may be advantageous as it may further increase the accuracy of the data predictions by comparing distributions obtained in the same way.

In another example, the historical data sets may have predefined values of the class label (e.g. known values). In this case, the historical class label distribution is determined using the predefined values. This may further increase the accuracy of the data predictions as it may use measured data as a reference.

According to one embodiment, the historical class label distribution includes at least one of: the average of each distinct value of the class label (AVERAGE), the difference (R) between the maximum and the minimum values of occurrence of each distinct value of the class label. The average of the distinct value may include the average of the occurrence of the distinct values in the historical data sets. For example, for each historical data set, the number of occurrences of each of its distinct values may be determined and the different number of occurrences corresponding to respective historical data sets may be averaged to obtain the average AVERAGE. If, for example, two historical data sets have the following respective sets of values of the class label: {0, 1, 3, 1, 3, 1, 3, 0, 0} and {0, 1, 3, 1, 1, 3, 0, 1, 1}. First, the number of occurrence of unique values is counted for each set. For set {0, 1, 3, 1, 3, 1, 3, 0, 0}, 0 occurred 3 times, 1 occurred 3 times and 3 occurred 3 times. For set {0, 1, 3, 1, 1, 3, 0, 1, 1}, 0 occurred 2 times, 1 occurred 5 times and 3 occurred 2 times. Second, Average number of occurrences per each unique of distinct value is calculated: for 0 the average is (3+2)/2 (where 2 in the denominator is the number of sets), for 1 the average is (3+5)/2 and for 3 the average is (3+2)/2. The difference R for each distinct value 0, 1 and 3 is respectively (Max=3−Min=2) for 0, (5−3) for 1 and (3−2) for 3.

According to one embodiment, the upper control limit and lower control limit are determined using the class label distribution and a control chart constant A2.

According to one embodiment, the upper control limit and lower control limit are determined for each distinct value of the class label of the historical data sets.

According to one embodiment, the upper control limit for a given distinct value of the class label is equal to AVERAGE+R*A2 and the lower control limit for the given distinct value is AVERAGE−R*A2.

FIG. 1 represents a general computer system, suited for implementing the method steps according to embodiments of the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM)). Note that the memory 110 can have a distributed architecture, where various components are situated remote from one another, but can be accessed by the processor 105.

The software in memory 110 may include one or more separate programs, each of which includes an ordered listing of executable instructions for implementing logical functions, notably the functions involved in embodiments of the present disclosure. In the example of FIG. 1, software in the memory 110 includes instructions or software 112 (e.g. instructions to manage databases such as a database management system).

The software in memory 110 shall also typically include a suitable operating system (OS) 111. The OS 111 essentially controls the execution of other computer programs, such as possibly software 112 for implementing methods as described herein.

The methods described herein may be in the form of a source program or software 112, executable program or software 112 (object code), script, or any other entity having a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may include a disk storage such as HDD storage.

The memory 110 includes a class label predictor 140 that is configured to predict a class label of one or more records using the values of the attributes of the records.

Figure 2:
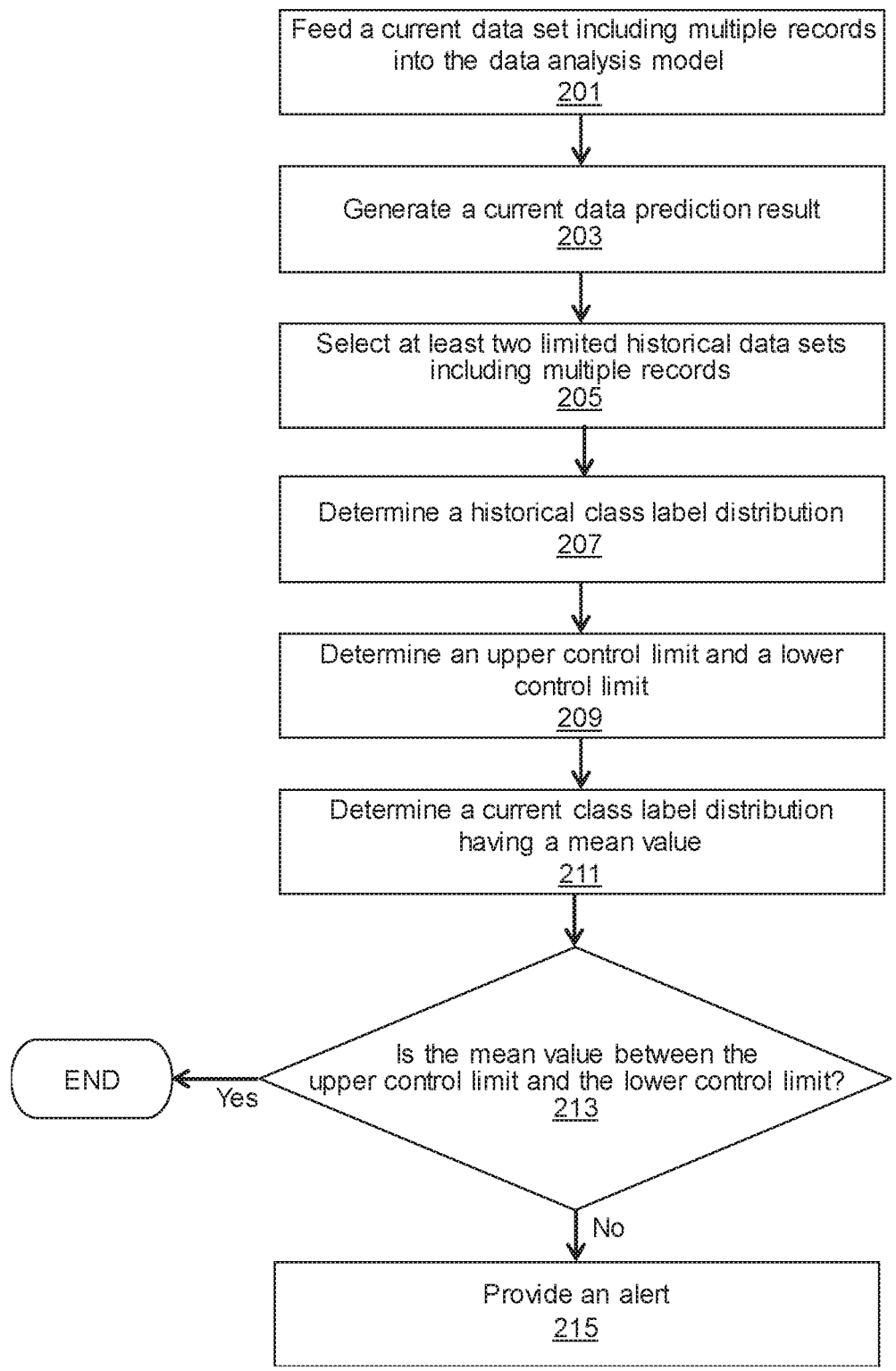
FIG. 2 depicts a flowchart of an example method of modifying a predictive data analysis model.

FIG. 2 is a flowchart of an example method of enabling modifying a predictive data analysis model. The predictive analysis model is modelled or defined from training data. The predictive analysis model may be executed or implemented, for example, by the class label predictor 140.

In step 201, a current data set including multiple records may be fed as input into the data analysis model. The current data set is a limited data set. The current data set is limited to data occurring in a current time window with a predetermined time window size. The time window size may be a timeframe window for prediction results gathering.

Figure 3:
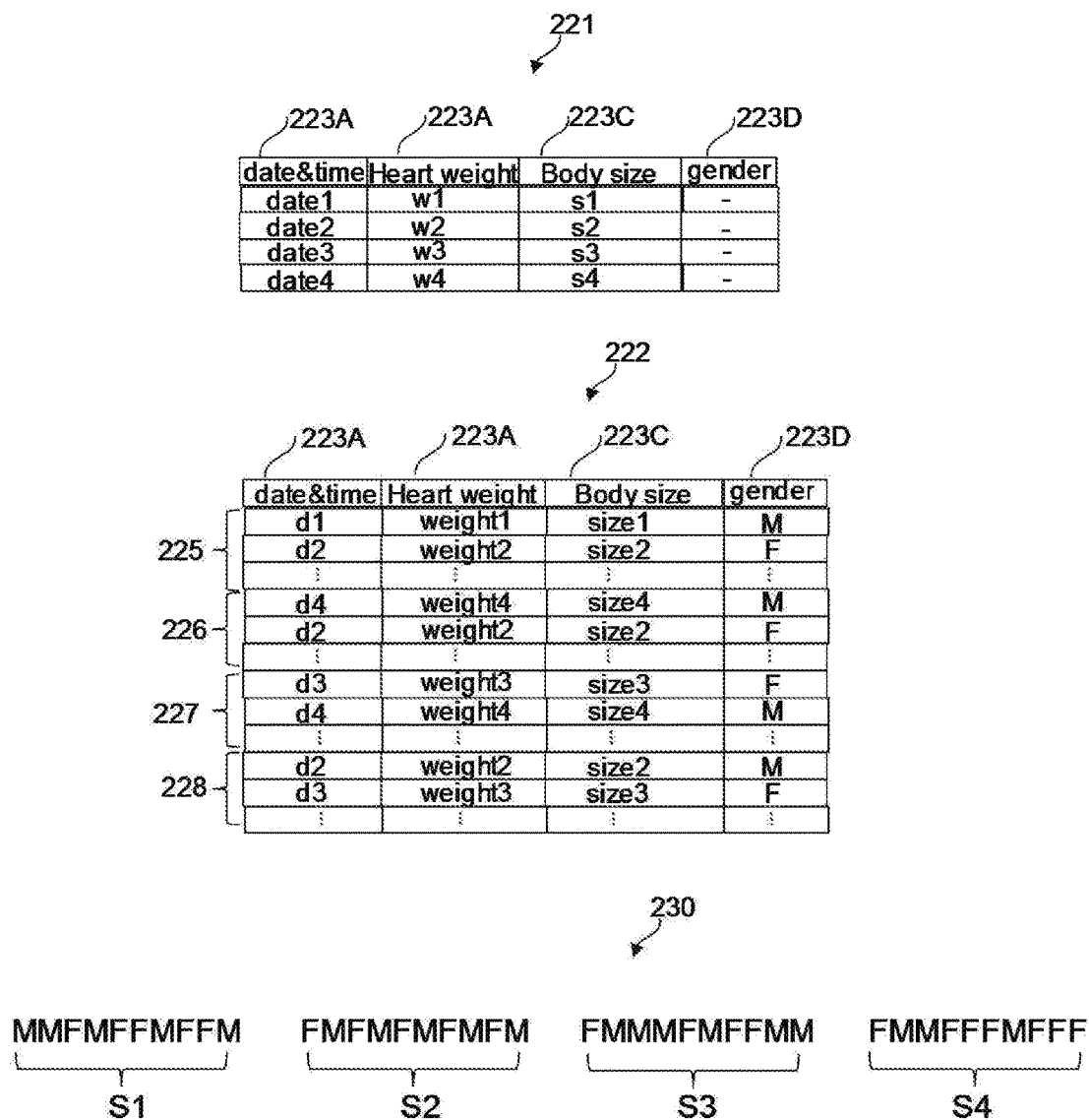
FIG. 3 depicts example data sets for use in the method of FIG. 2.

For example, the current data set may include new data with an unknown target class label. FIG. 3 shows an example of the current data set 221 which includes a data table having fields 223A-223D, where the field "gender" 223D corresponds to the class label. As indicated by sign "-" in FIG. 3, the value of class label 223D for each record of the current data set 221 is not known. For example, the predictive data analysis model may determine, based on body size and heart weight, gender (M-male, F-female).

The term "data table" or data set, as used herein, refers to a collection of data that may be presented in tabular form. Each column in the data table may represent a particular variable or attribute. Each row in the data table may represent a given member, record or entry of the data table.

In step 203, the data analysis model may be run or executed on the current data set 221 such that it generates a current data prediction result. The data prediction result includes label values of the class label 223D as estimated or predicted by the data analysis model. Using the values of the attributes 223A-C in each record, the data analysis model may predict the value of the class label 223D of the each record.

Prediction results may be grouped into a data set based on time window size. For example, K may be size or number of records for which the values of the class label 223D have been predicted within the time window. K may be smaller or equal the number of records of the current data set 221. K indicates the time window size in term of number of records.

For example, for a time window of 4 h, the prediction within 4 h will be grouped as a predicted class label set. In other terms, the values of the class label 223D that are predicted may be grouped in the predicted class label set. In another example, the predicted values may be stored in the current data set 221 in association with an indication of their respective time window. For example, each record of the current data set 221 having a corresponding given predicted value of the class label may include an indicator. The indicator has a value indicating that the record having the given predicted value belongs to a given time window.

In step 205, at least two limited historical data sets including multiple records may be selected. Each record of the records of the historical data sets includes values for several features or attributes. For example, the attributes of each record of the historical data sets may include at least part of the attributes 223A-D of the current data set 221. For example, FIG. 3 illustrates four historical data sets 225-228 including the same attributes 223A-D as the current data set 221. Each set of the historical data sets 225-228 is limited to data occurring in a historical time window having the window size. As shown in FIG. 3, the historical data sets 225-228 are data with known target class label 223D (i.e.

they include values for the class label 223D). Each historical data set 225-228 includes multiple records as illustrated by the dots sign.

In one example, as illustrated in FIG. 3, the historical data sets 225-228 may be selected from a parent historical data set 222 including at least all records of the historical data sets 225-228. Using the example of FIG. 3, the selection may, for example, be performed by sorting the records by the attribute "date&time" 223A, and dividing the sorted parent historical data set 222 into S subsets 230 where S=N/K (the historical dataset size divided by window size in number of records). If, for example, the parent historical data set includes N=40 records and K=10, then 4 historical data sets may be selected from the historical data set and corresponding sets S1-S4 230 are shown in FIG. 3.

In another example, the historical data sets 225-228 may be selected among other predefined historical data sets of equal size (e.g. each having K records). The selection may, for example, be user defined or may be randomly performed.

The training data may, or may not, include at least part of the historical data sets.

FIG. 3 shows 4 sets S1-S4 230 of values of the class label 223D in each of the respective historical data sets 225-228.

In step 207, a historical class label distribution may be determined for the historical data sets 225-228. The historical class label distribution may be a distribution of the values of the class label 223D in the historical data sets 225-228.

For example, for each set S1-S4 of the 4 sets 230, an occurrence matrix or occurrence vector may be created. The occurrence matrix indicates for the corresponding set S1-S4 the number of occurrences of the distinct values. In the example of FIG. 3, the occurrence matrix of S1 indicates that the distinct value "M" occurs 5 times while the distinct value "F" occurs 5 times. The occurrence matrix of S2 indicates that the distinct value "M" occurs 5 times while the distinct value "F" occurs 5 times. The occurrence matrix of S3 indicates that the distinct value "M" occurs 6 times while the distinct value "F" occurs 4 times. The occurrence matrix of S4 indicates that the distinct value "M" occurs 3 times while the distinct value "F" occurs 7 times.

S1:5(M), 5(F)
S2:5(M), 5(F)
S3:6(M), 4(F)
S4:3(M), 7(F)

The historical class label distribution may, for example, include the average (AVERAGE) value of the two distinct values M and F in the four historical datasets 225-228. The average value of the distinct value "M" is 4.75 and the average value of the distinct value "F" is 5.25:

AVERAGE(M)=4.75
AVERAGE(F)=5.25

Alternatively, or additionally, the historical class label distribution may indicate the difference (R) between maximum and minimum occurrences of each distinct value ("M" and "F") in all the fours historical data sets 225-228: R(M)=MAX-MIN=6-3=3; and R(F)=MAX-MIN=7-4=3.

In one example, the values of the class label 223D may be obtained by measurements.

In another example, the values of the class label 223D may be estimated or predicted by executing the data analysis model on the historical data sets 225 and 227.

In step 209, an upper control limit and a lower control limit may be determined for the historical data sets 225-228 using the historical class label distribution. For example, a pair of an upper and lower control limit may be determined for each distinct value of the class label in the historical data sets 225-228. Following the example of FIG. 3, two pairs of upper and lower limits may be calculated or determined for the two distinct values "M" and "F" of class label 223D.

The upper control limit (UCL) may be defined as follows: UCL=AVERAGE+R*A2 and the lower control limit (LCL) may be defined as follows LCL=AVERAGE-R*A2, where A2 is a correction constant (control chart constant) from statistical tables which depends on size of measurements n. In this example, a measurement may correspond to a data set and thus the size is 4 which corresponds to the number of historical data sets 225-228. The following table provides values of A2 depending on the number of measurements (n):

| n | A2 |
|---|---|
| 2 | 1.880 |
| 3 | 1.023 |
| 4 | 0.729 |
| 5 | 0.577 |
| 6 | 0.483 |
| 7 | 0.419 |
| 8 | 0.373 |
| 9 | 0.337 |
| 10 | 0.308. |

Following the example of FIG. 3, A2 would be equal to 0.729, and the limits are as follows:
UCL(M)=4.75+3*0.729=6.937
LCL(M)=4.75-3*0.729=2.563
UCL(F)=5.25+2*0.729=6.708
UCL(F)=5.25-2*0.729=3.792

In step 211, a current class label distribution for the current prediction result having a mean value may be determined. In other terms, the current class label distribution is determined for the values of the class label 223D as predicted in step 203. The current class label distribution may include the mean occurrence of the distinct values of the class label 223D of the current data set 221. For example, AVERAGE_new(M)=5 and AVERAGE_new(F)=4. The mean values may, for example, be obtained as follows. Predicted labels are grouped into subset/window. In the next step, the average number of occurrences of particular labels is calculated (sum of occurrence number in each subset/window divided by the number of subsets/windows). For example, if there are 3 windows/subsets of size 10: FFFF MMMMMM; FFFFF MMMMM and FF MMMMMMMM, AVERAGE_new(M)=(6+5+8)/3=6,33 and AVERAGE_new (F)=(3+5+2)/3=3,333.

In the case (inquiry 213) where the mean value is not between the upper control limit and the lower control limit, an alert may be provided in step 215. For example, the user of the system 100 may be alerted or notified that the data analysis model may need to be modified as the mean value is not between the upper and lower limits. In one example, step 215 may additionally, or alternatively, include modifying the data analysis model. The modification of the data analysis model may be user driven or may automatically be performed. For example, the data analysis model may automatically be retrained using another predefined training data set. In another example, the modification may include switching to another data analysis model. Upon modification of the data analysis data model, the method steps 201-215 may be repeated. For example, the repetition may be performed until the mean value is between the upper and lower limits.

In another example, a method of modifying a predictive data analysis model is provided. The method includes the steps: feeding a limited current data set including multiple records, into said data analysis model, wherein said current data set is limited to data occurring in a current time window with a predetermined window size, running said model on said current data set and generating a current data prediction result, selecting a limited historical data set including multiple records, each including values for several features, wherein said historical data set is limited to data occurring in a historical time window having said window size, feeding said historical data set into said data analysis model, running said data analysis model on said historical data set and generating a historical data prediction result, determining a class label distribution for said historical prediction result, determining an upper control limit and a lower control limit for said historical prediction result, determining a class label distribution for said current prediction result, having a mean value, modifying said data analysis model if said mean value is not between said upper control limit and said lower control limit.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for enabling modification of a predictive data analysis model, the method comprising:
    feeding a current data set into the predictive data analysis model, the current data set comprising multiple records, wherein the current data set is limited to data occurring in a current time window with a predetermined window size;
    running the predictive data analysis model on the current data set and generating a current data prediction result;
    selecting at least two limited historical data sets comprising multiple records, each comprising values for several features, wherein each set of the historical data sets is limited to data occurring in a historical time window having the window size;
    determining a historical class label distribution for the historical data sets;
    determining an upper control limit and a lower control limit for the historical data sets using the historical class label distribution;
    determining a current class label distribution for the current prediction result, the current class label distribution having a mean value; and
    providing an alert in response to the mean value not being between the upper control limit and the lower control limit.

2. The method of claim 1, further comprising:
    feeding the historical data sets into the data analysis model; and
    running the data analysis model on the historical data sets and generating a historical data prediction result, wherein the determining of the historical class label distribution is based on the historical data prediction result.

3. The method of claim 1, wherein the class label distribution comprises the average of each distinct value of the class label (AVERAGE) and the difference (R) between the maximum and the minimum values of each distinct value of the class label.

4. The method of claim 1, wherein the upper control limit and the lower control limit are determined using the class label distribution and a control chart constant A2.

5. The method of claim 1, wherein the upper control limit and the lower control limit are determined for each distinct value of the class label of the historical data sets.

6. The method of claim 5, wherein the upper control limit for a given distinct value of the class label is AVERAGE+R*A2 and the lower control limit for the given distinct value is AVERAGE−R*A2.

7. A computer program product for enabling modification of a predictive data analysis model, the computer program product comprising a computer-readable storage medium having computer-readable program code embodied therewith, the computer-readable program code executable by a processor to perform a method comprising:
    feeding a current data set into the predictive data analysis model, the current data set comprising multiple records, wherein the current data set is limited to data occurring in a current time window with a predetermined window size;
    running the predictive data analysis model on the current data set and generating a current data prediction result;
    selecting at least two limited historical data sets comprising multiple records, each comprising values for several features, wherein each set of the historical data sets is limited to data occurring in a historical time window having the window size;
    determining a historical class label distribution for the historical data sets;
    determining an upper control limit and a lower control limit for the historical data sets using the historical class label distribution;
    determining a current class label distribution for the current prediction result, the current class label distribution having a mean value; and providing an alert in response to the mean value not being between the upper control limit and the lower control limit.

8. The computer program product of claim 7, wherein the method further comprises:
    feeding the historical data sets into the data analysis model; and
    running the data analysis model on the historical data sets and generating a historical data prediction result, wherein the determining of the historical class label distribution is based on the historical data prediction result.

9. The computer program product of claim 7, wherein the class label distribution comprises the average of each distinct value of the class label (AVERAGE) and the difference (R) between the maximum and the minimum values of each distinct value of the class label.

10. The computer program product of claim 7, wherein the upper control limit and the lower control limit are determined using the class label distribution and a control chart constant A2.

11. The computer program product of claim 7, wherein the upper control limit and the lower control limit are determined for each distinct value of the class label of the historical data sets.

12. The computer program product of claim 7, wherein the upper control limit for a given distinct value of the class label is AVERAGE+R*A2 and the lower control limit for the given distinct value is AVERAGE−R*A2.

13. A computer system for enabling modification of a predictive data analysis model, the computer system comprising a memory and a processor in communication with the memory, the system configured to perform a method comprising:
- feeding a current data set into the predictive data analysis model, the current data set comprising multiple records, wherein the current data set is limited to data occurring in a current time window with a predetermined window size;
- running the predictive data analysis model on the current data set and generating a current data prediction result;
- selecting at least two limited historical data sets comprising multiple records, each comprising values for several features, wherein each set of the historical data sets is limited to data occurring in a historical time window having the window size;
- determining a historical class label distribution for the historical data sets;
- determining an upper control limit and a lower control limit for the historical data sets using the historical class label distribution;
- determining a current class label distribution for the current prediction result, the current class label distribution having a mean value; and
- providing an alert in response to the mean value not being between the upper control limit and the lower control limit.

14. The computer system of claim 13, wherein the method further comprises:
- feeding the historical data sets into the data analysis model; and
- running the data analysis model on the historical data sets and generating a historical data prediction result, wherein the determining of the historical class label distribution is based on the historical data prediction result.

15. The computer system of claim 13, wherein the class label distribution comprises the average of each distinct value of the class label (AVERAGE) and the difference (R) between the maximum and the minimum values of each distinct value of the class label.

16. The computer system of claim 13, wherein the upper control limit and the lower control limit are determined using the class label distribution and a control chart constant A2.

17. The computer system of claim 13, wherein the upper control limit and the lower control limit are determined for each distinct value of the class label of the historical data sets.

18. The computer system of claim 13, wherein the upper control limit for a given distinct value of the class label is AVERAGE+R*A2 and the lower control limit for the given distinct value is AVERAGE−R*A2.

* * * * *